United States Patent
Little

(10) Patent No.: US 9,409,503 B2
(45) Date of Patent: Aug. 9, 2016

(54) RATCHETING VEHICLE HEAD RESTRAINT ASSEMBLY

(71) Applicant: Windsor Machine and Stamping (2009) Ltd., Windsor (CA)

(72) Inventor: Mark Leonard Little, Maidstone (CA)

(73) Assignee: WINDSOR MACHINE AND STAMPING (2009) LTD., Windsor (CA)

(*) Notice: Subject to any disclaimer, the term of this patent is extended or adjusted under 35 U.S.C. 154(b) by 0 days.

(21) Appl. No.: 14/622,071

(22) Filed: Feb. 13, 2015

(65) Prior Publication Data

US 2015/0232002 A1 Aug. 20, 2015

Related U.S. Application Data

(60) Provisional application No. 61/940,079, filed on Feb. 14, 2014.

(51) Int. Cl.
*A47C 7/36* (2006.01)
*B60N 2/48* (2006.01)

(52) U.S. Cl.
CPC .................. *B60N 2/4844* (2013.01)

(58) Field of Classification Search
CPC .. B60N 2/4844; B60N 2/4841; B60N 2/4838; A47C 7/38
USPC .................................................. 297/408, 391
See application file for complete search history.

(56) References Cited

U.S. PATENT DOCUMENTS

| | | | | |
|---|---|---|---|---|
| 7,669,932 B1* | 3/2010 | Gronninger | ........... | B60N 2/4817 297/216.12 |
| 8,979,203 B1* | 3/2015 | Sutter, Jr. | ............. | B60N 2/4844 297/408 |
| 2004/0108766 A1* | 6/2004 | Baker | ................... | B60N 2/4844 297/408 |
| 2007/0164593 A1* | 7/2007 | Brockman | ........... | B60N 2/4847 297/408 |
| 2009/0152923 A1* | 6/2009 | Seo | ...................... | B60N 2/4855 297/403 |
| 2012/0068517 A1* | 3/2012 | Yetukuri | ............... | B60N 2/4847 297/408 |
| 2012/0212017 A1* | 8/2012 | Takayama | ............ | B60N 2/4221 297/216.12 |
| 2013/0193736 A1* | 8/2013 | Shimizu | ............... | B60N 2/4844 297/391 |
| 2014/0167476 A1* | 6/2014 | Wang | .................... | B60N 2/4844 297/391 |
| 2014/0210244 A1* | 7/2014 | Tobata | ................. | B60N 2/4847 297/408 |
| 2014/0210245 A1* | 7/2014 | Tobata | ................. | B60N 2/4847 297/408 |
| 2014/0265507 A1* | 9/2014 | Fredriksson | ......... | B60N 2/4841 297/408 |
| 2015/0266401 A1* | 9/2015 | Grable | ................. | B60N 2/4855 297/408 |

* cited by examiner

*Primary Examiner* — Jose V Chen
(74) *Attorney, Agent, or Firm* — Cantor Colburn LLP

(57) ABSTRACT

A head restraint assembly is provided and includes a base including a cross member. Also included is a head restraint having a housing. Further included is an internal cavity at least partially defined by the housing. Yet further included is a lock mechanism assembly retained within the internal cavity, the lock mechanism assembly comprising first and second lock members, the first lock member including a first plurality of teeth and the second lock member including a second plurality of teeth, wherein the pluralities of teeth are engageable with each other and selectively rotatable with respect to each other in first and second directions. Also included is an actuator arm engaged with the second lock member and configured to selectively permit rotation of the second lock member relative to the first lock member.

15 Claims, 6 Drawing Sheets

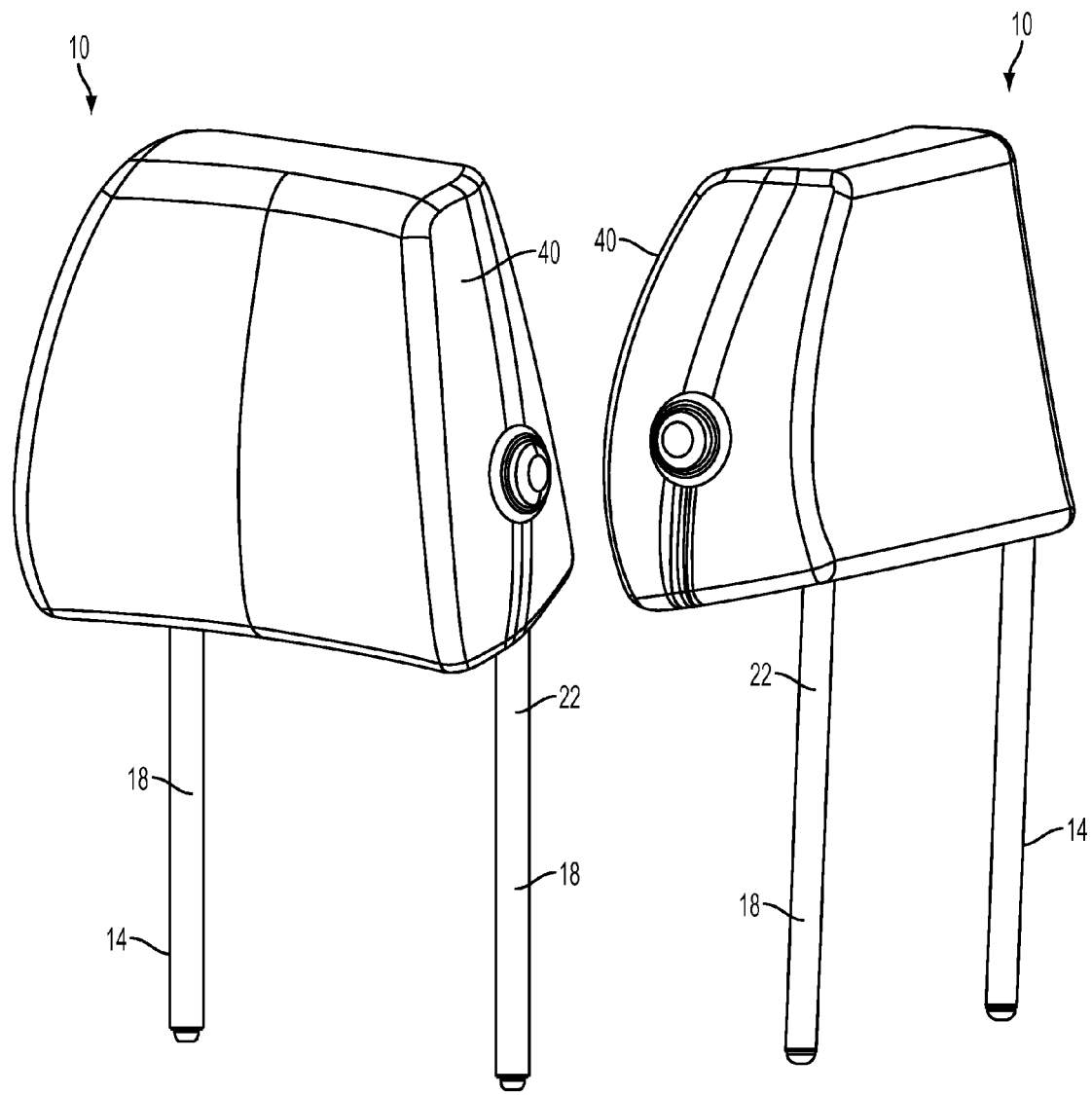

RATCHETING VEHICLE HEAD RESTRAINT ASSEMBLY

CROSS-REFERENCE TO RELATED APPLICATIONS

This patent application claims priority to U.S. Provisional Patent Application Ser. No. 61/940,079 filed Feb. 14, 2014, which is incorporated herein by reference in its entirety.

BACKGROUND OF THE INVENTION

The subject matter disclosed herein relates to head restraints and, more particularly, to a ratcheting vehicle head restraint assembly.

Many vehicles, such as automobiles, include a headrest or head restraint atop an occupant's seat and in a position adjacent the occupant's head. Head restraints are typically cushioned for comfort, are height adjustable, and most are commonly finished in the same material as the rest of the seat. When travelling in an automobile, a properly adjusted headrest can reduce the severity of neck injuries such as whiplash in the event of a collision. Unfortunately, adjustment of head restraints is often cumbersome and potentially discouraging for an occupant to make the proper adjustment.

BRIEF DESCRIPTION OF THE INVENTION

According to one aspect of the invention, a head restraint assembly is provided and includes a base including a cross member. The head restraint assembly also includes a head restraint having a housing. The head restraint assembly further includes an internal cavity at least partially defined by the housing. The head restraint assembly yet further includes a lock mechanism assembly retained within the internal cavity, the lock mechanism assembly comprising a first lock member and a second lock member, the first lock member including a first plurality of teeth and the second lock member including a second plurality of teeth, wherein the first plurality of teeth and the second plurality of teeth are engageable with each other and selectively rotatable with respect to each other in a first direction and a second direction. The head restraint assembly also includes an actuator arm engaged with the second lock member and configured to selectively permit rotation of the second lock member relative to the first lock member.

According to another aspect of the invention, a head restraint assembly for a vehicle is provided and includes a base including a cross member. The head restraint assembly also includes a head restraint having a housing at least partially defining an internal cavity. The head restraint assembly further includes a lock mechanism assembly retained within the internal cavity, the lock mechanism assembly comprising a first lock member and a second lock member, the first lock member including a first plurality of teeth and the second lock member including a second plurality of teeth, wherein the first plurality of teeth and the second plurality of teeth are engageable with each other to permit rotation of the head restraint in a forward direction of the vehicle and to restrict rotation of the head restraint in a rearward direction of the vehicle in a first condition of the lock mechanism. The head restraint assembly yet further includes an actuator arm engaged with the second lock member and configured to selectively permit rotation of the head restraint in the rearward direction in a second condition of the lock mechanism. The head restraint assembly also includes a push button accessible to a user to manipulate the lock mechanism from the first condition to the second condition, the actuator arm comprising a linkage. The linkage includes a first linkage member operatively coupled to the push button. The linkage also includes a connector coupled to the first linkage member, the connector biased with a torsion spring. The linkage further includes a second linkage member operatively coupled to the connector and to the second lock member, wherein the connector is biased in a direction that biases the lock mechanism to be in the first condition.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 1 is a front perspective view of a head restraint assembly;

FIG. 2 is rear perspective view of the head restraint assembly;

Figure 3:
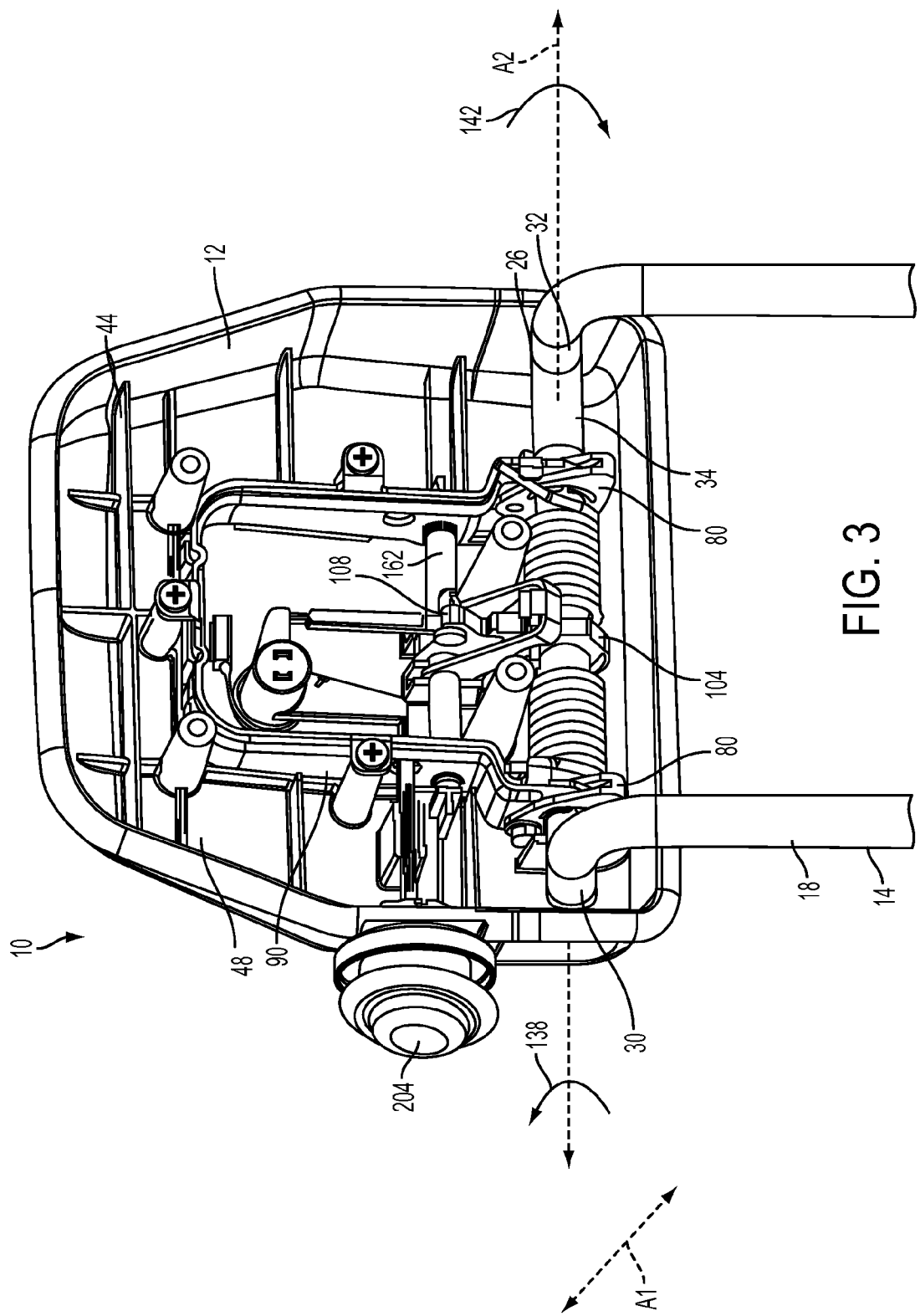
FIG. 3 is a rear perspective view of the head restraint assembly with a cover removed, illustrating various components of the head restraint assembly located within an internal cavity thereof.

The detailed description explains embodiments of the invention, together with advantages and features, by way of example with reference to the drawings.

DETAILED DESCRIPTION OF THE INVENTION

Referring to FIGS. 1 and 2, a head restraint assembly 10 is schematically depicted. The head restraint assembly 10 includes a base portion 14 (which may also be referred to as an "armature") that is mountable to a vehicle seat (not shown), and, more specifically, to the upper portion of the seatback of the vehicle seat. In the illustrated embodiment, the base portion 14 is formed from a single piece of metal and includes two parallel post portions 18 that are mounted, or mountable, to the top of the seatback of the vehicle seat, as understood by those skilled in the art. Each of the post portions 18 includes a respective elongated, straight portion 22. Each of the straight portions 22 extends into a respective hole formed in the top of the seatback to attach the head restraint assembly 10 to the vehicle seat.

Referring to FIG. 3, the head restraint assembly 10 is illustrated with a cover 41 (FIGS. 1 and 2) removed to show an internal cavity 12 of the head restraint assembly 10 and components partially or completely disposed therein. As shown, the base portion 14 also includes a cross member portion 26 that interconnects the two post portions 18. When the base portion 14 is connected to a vehicle seat, the post portions 18 are generally vertical, and the cross member portion 26 is generally horizontal. The cross member portion 26 includes segments 30, 32, 34. When the base portion 14 is connected to an upright vehicle seat, each of segments 30, 32 extends from an upper end of a respective one of the post portions 18 in a direction substantially parallel to axis A1. Segment 34 extends substantially perpendicularly to axis A1 to interconnect segments 30, 32. It is to be appreciated that more or less segments may be included to form alternative embodiments of the cross member portion 26.

As shown in at least FIGS. 1 and 2, the head restraint assembly 10 further includes a head restraint 40 operatively connected to base portion 14. In the embodiment depicted, the head restraint 40 includes a housing 44 (FIG. 3) that provides rigid structure to the head restraint 40. The head restraint 40 also includes the cover 41 that is mounted with respect to the housing 44 for movement therewith. A head restraint cushion is comprised of soft foam or a like material to provide a cushion between the head of a human occupant of the vehicle seat and the head restraint housing 44. The head restraint cover covers at least part of the cushion and the housing to enhance the aesthetics of the head restraint. Exemplary cover materials include cloth, vinyl, leather, etc.

The housing 44 is comprised of a one-piece plastic shell 48. The shell 48 at least partially defines the internal cavity 12 therebetween, and referred to above. The shell 48 may be formed of numerous contemplated materials. In one embodiment, the shell 48 is formed of plastic. Two apertures 88 are defined by the cover 41 and/or the shell 48 and are each configured to receive one of segments 30, 32. The segments 30, 32 of the base portion extend through a respective one of the apertures 88 to enter the internal cavity 12. Segment 34 extends through respective apertures partially defined by retaining components 80 fixed to the housing 44, as described in detail below. The retaining components 80 may be fixed to the shell 48, as illustrated. Irrespective of the precise structural arrangement of the retaining components 80 and the cross member portion 26, the retaining components 80 permit radial movement of the shell 48 relative to axis A2 of segment 34.

Figure 4:
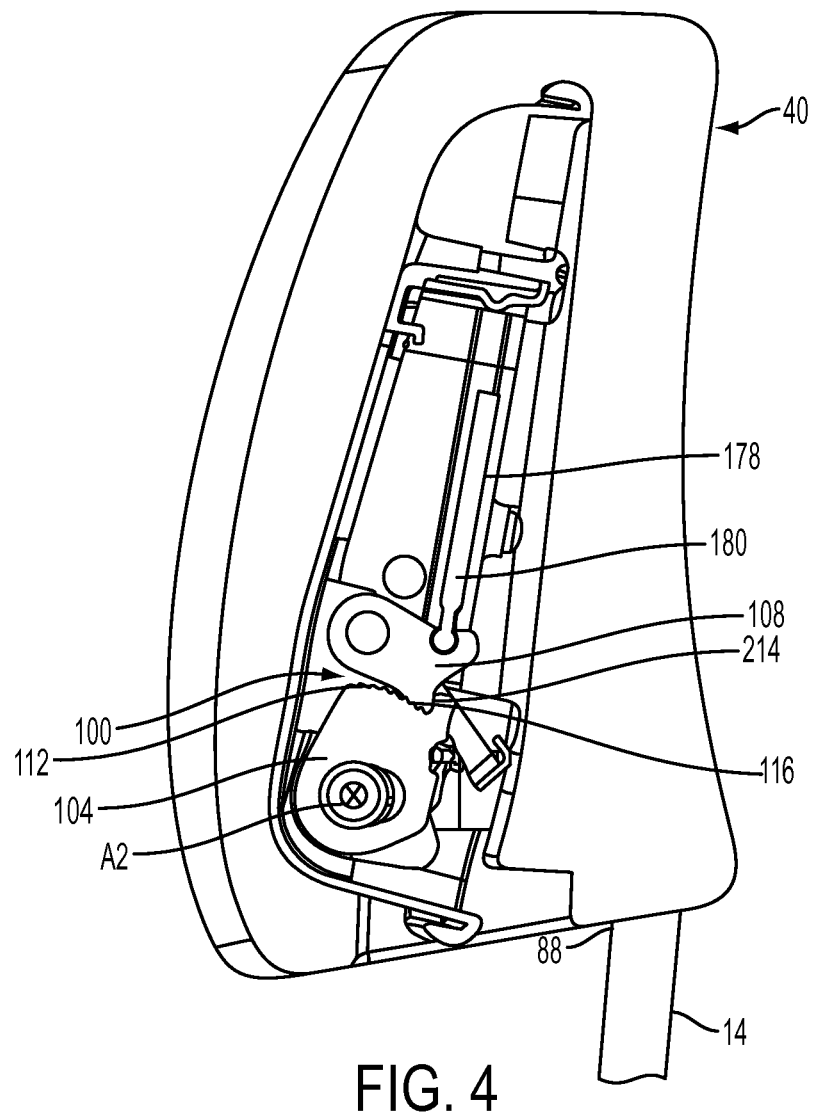
FIG. 4 is a partially cut-away side view of the head restraint assembly, illustrating a locking mechanism assembly.
Figure 5:
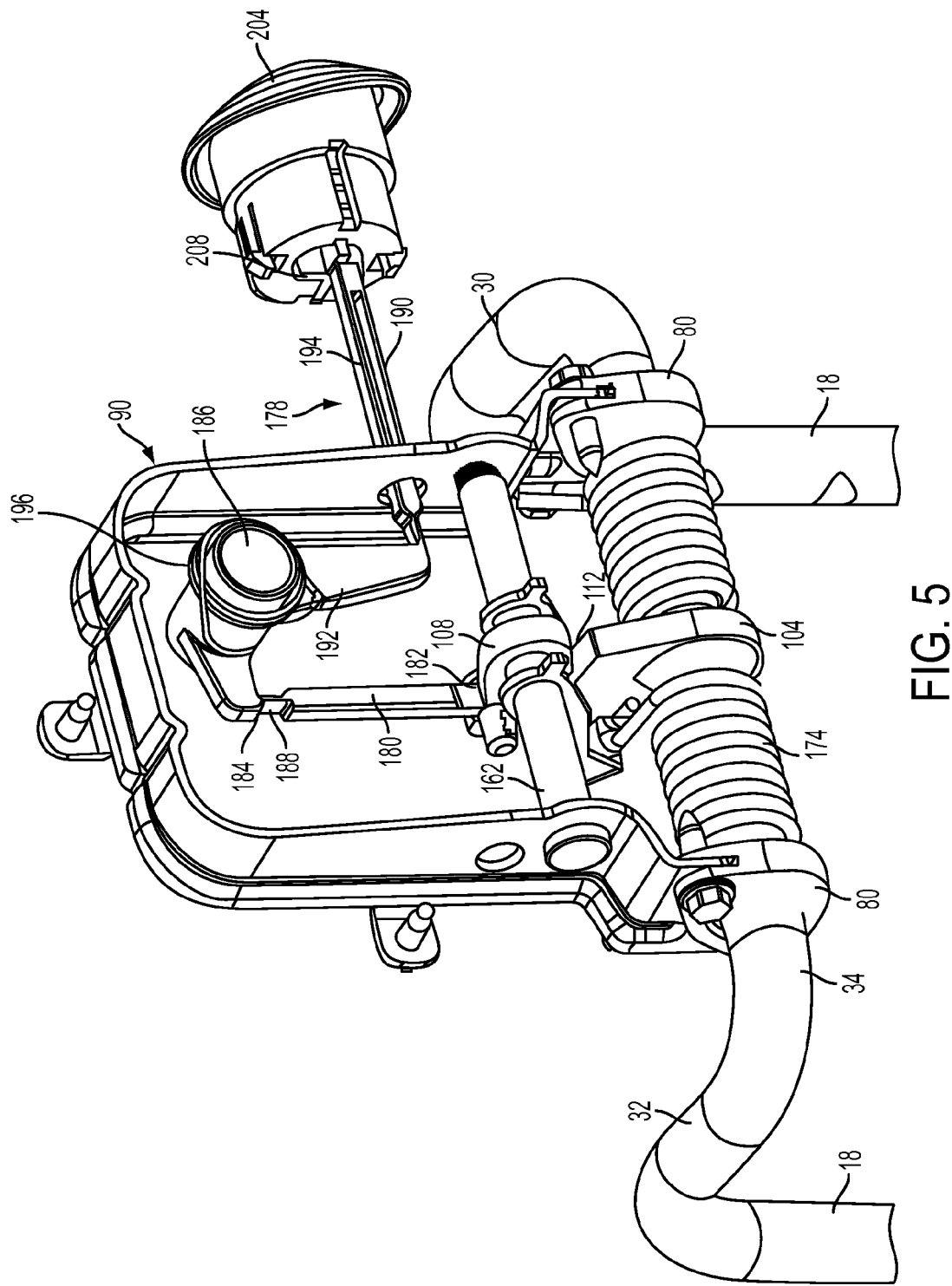
FIG. 5 is a side, partial cross-sectional view of the head restraint assembly with the cover and a housing removed.
Figure 6:
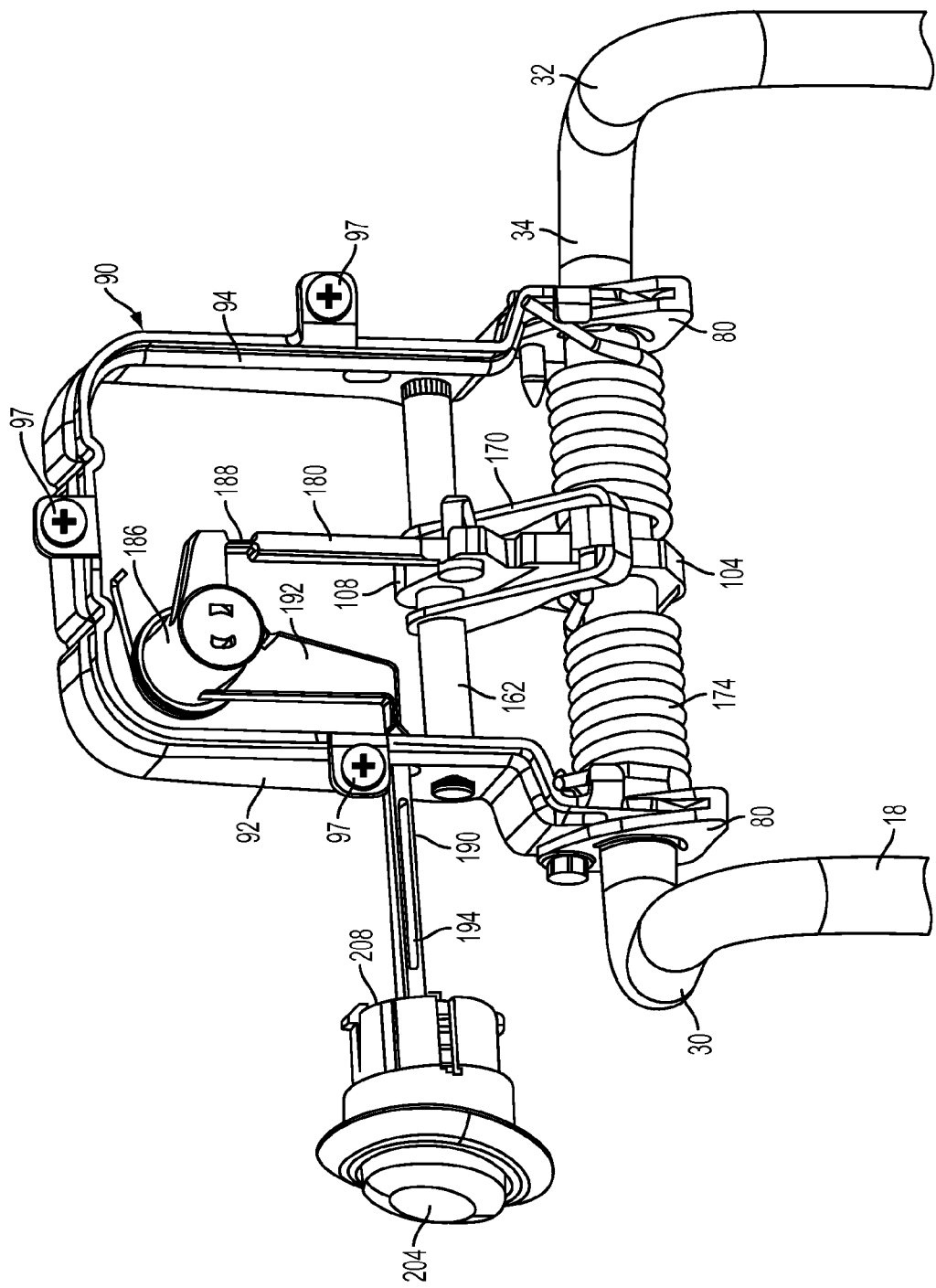
FIG. 6 is a front, perspective view of the locking mechanism with the cover and the housing removed.

Referring to FIGS. 4-6, a locking mechanism assembly 100 selectively locks the head restraint 40 with respect to the base portion 14, thereby preventing rotation of the head restraint 40 relative to the base portion 14 about the axis A2. The locking mechanism 100 is configured such that a vehicle user or occupant can adjust the rotational (i.e., angular) position of the head restraint 40 relative to the base portion 14 (and the seatback of the seat) to optimize comfort. More specifically, the locking mechanism assembly 100 selectively locks the head restraint 40 in any one of a plurality of different rotational positions.

The locking mechanism assembly 100 includes a first lock member 104 (which may be referred to as a "lock plate" or "lower lock ratchet") and a second lock member 108 (which may be referred to as a "lock lever" or "upper lock ratchet"). The first lock member 104 defines a first plurality of teeth 112. The second lock member 108 defines a second plurality of teeth 116.

As described above, the first lock member 104 is rotatably mounted with respect to segment 34 of the cross member portion 26, such that the first lock member 104 is selectively rotatable about axis A2. More specifically, the first lock member 104 defines a circular hole 130 through which the cross member portion 26 extends. In its default position (about axis A2), the first lock member 104 is disposed such that the second plurality of teeth 116 is in contact with, and therefore engaged with, the first plurality of teeth 112.

The lock members 104, 108 are arranged such that, when the head restraint 40, including housing 44, is rotated in a forward direction 138 about axis A2 relative to the base portion 14, the second lock member 108 slides across the first lock member 104, and, more specifically, the second plurality of teeth 116 slides across the first plurality of teeth 112. The teeth 112, 116 are not self-locking in the forward direction 138; that is, the teeth 112, 116 do not prevent rotation of the head restraint 40 about axis A2 in the forward direction. As the second lock member 108 slides across the first lock member 104, the first plurality of teeth 112 force the second plurality of teeth 116 upward (as viewed in the figures) and away from the first lock member 104 as each of the teeth 116 traverses over a respective one of the teeth 112 until further rotation of the housing 44 causes each of the teeth 116 to rest in respective spaces between the teeth 112. The upward movement of teeth 116 caused by teeth 112 (during rotation of the housing 44 about axis A2) results in the second lock member 108 pivoting about axis A2.

The teeth 112, 116 are self-locking in the rearward rotational direction 142 about axis A2. That is, a force exerted on the head restraint 40 urging the head restraint to rotate in the rearward direction 142 about axis A2 will not result in rotation of the head restraint 40 because the teeth 112, 116 will be locked and prevent such movement. However, as noted above, when a force is exerted on the head restraint 40 urging the head restraint 40 to rotate about axis A2 in the first rotational direction 138, teeth 116 will slide across teeth 112, thereby permitting the head restraint 40 to rotate in the forward direction 138.

Figure 8:
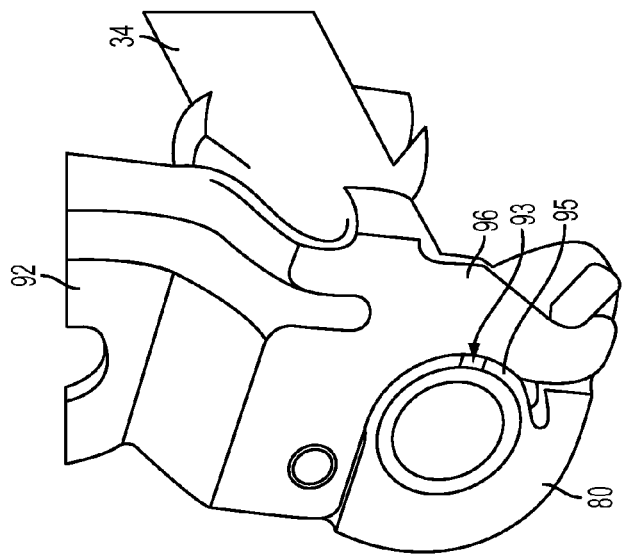
FIG. 8 is a sectional view of the frame and the base in an assembled condition.
Figure 7:
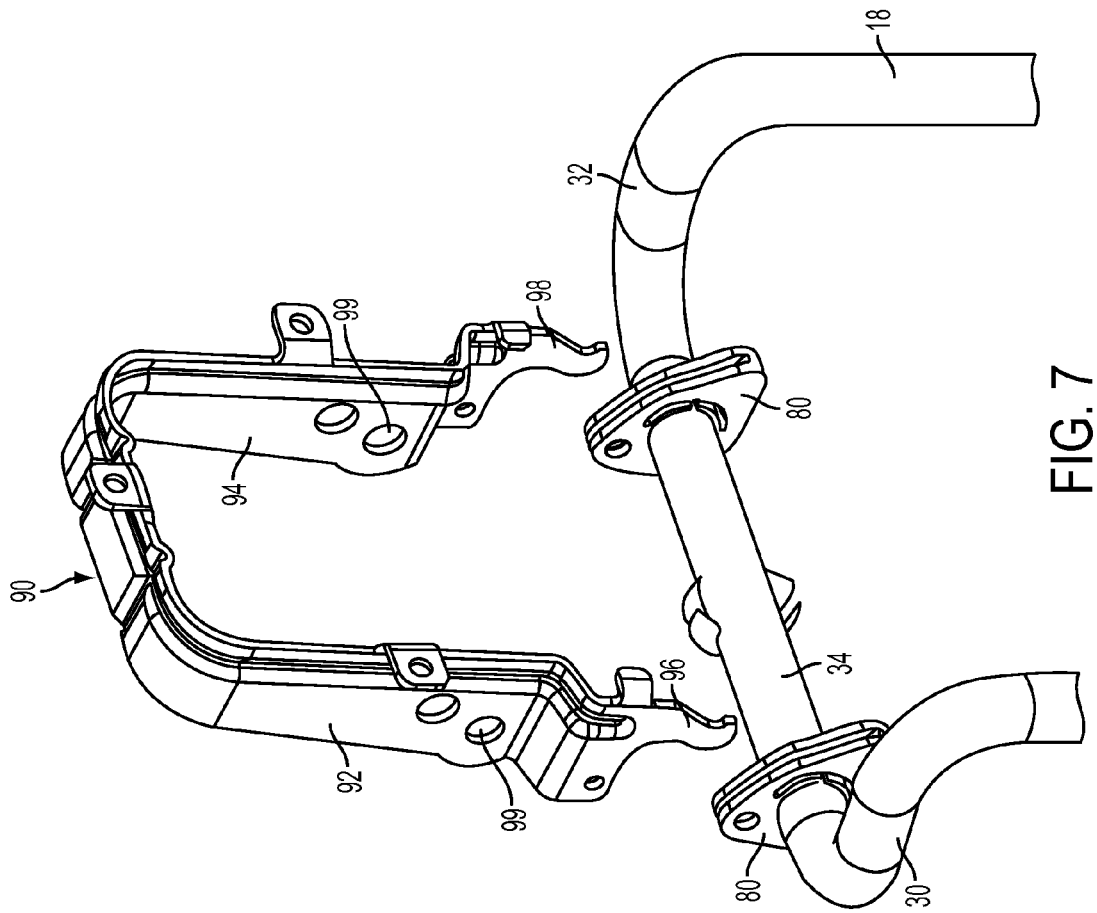
FIG. 7 is a rear, perspective view of a frame and a base in a pre-assembled condition.

Referring to FIGS. 3 and 5-7, a frame 90 is disposed within the interior cavity 12 of the head restraint assembly 10. The frame 90 is substantially U-shaped with downwardly extending legs 92, 94 and is operatively coupled to the housing 44. In the illustrated embodiment, the frame 90 is coupled to the front shell 48 with a plurality of mechanical fasteners 97. Leg 92 terminates at a first end region 96 and leg 94 terminates at a second end region 98. Each end region 96, 98 is inserted into a gap 91 of the retaining components 80. The frame 90 and the retaining components 80 are illustrated in a pre-assembled condition in FIG. 7 and an assembled condition in FIG. 8. As shown, the frame 90 and the retaining components 80 combine to form a cross member aperture 93 that retains segment 34 of the cross member portion 26. A bushing 95 is disposed between the end regions 96, 98 and the segment 34 to isolate the end regions 96, 98 from the cross member 26. This is particularly beneficial in embodiments where the frame 90 is formed of steel. Additionally, the arrangement facilities ease of assembly.

At least one torsion spring 174 is wrapped around the cross member portion 26 and operatively coupled to the lock mechanism 100 to maintain a rearward bias on the head restraint 40; that is, the springs 174 urge the head restraint 40 in the rearward rotational direction 142.

The frame 90 also defines a pin receiving aperture 99 in each downwardly extending leg 92, 94. A pin 162 extends through the apertures 99 and through a hole in the second lock member 108, thereby providing an axis for the second lock member 108 to rotate about for disengagement from the first lock member 104. Additionally, a forward stop member 170 is operatively coupled to the pin 162 and positioned to engage a stop surface of the first lock member 104 to limit forward movement of the head restraint 40. A stop surface 214 on the first lock member 104 forces the second lock member 108 to re-engage the lock teeth 112 at the most rearward position of the head restraint 40.

As best shown in FIGS. 3, 5 and 6, an actuator arm 178 is provided to facilitate operation of the lock mechanism assembly 100. The actuator arm 178 is a linkage formed by a plurality of linkage segments. In one embodiment, the linkage segments are formed of plastic. A first linkage segment 180 is operatively coupled to the second lock member 108. The coupled relationship between the first linkage segment 180 and the second lock member 108 may be made in any suitable manner. For example, a pin, bolt or the like may be inserted through the components or a threaded relationship may be formed. Regardless of the precise coupling, the first linkage segment 180 is engaged at a first end 182 thereof. The first linkage segment 180 is operatively coupled at a second end 184 to a connector 186 that is coupled to the housing 44. Although described above as a coupled relationship between the first linkage segment 180 and the connector 186, the components are integrally formed with each other in an exemplary embodiment. One or more hinged portions 188 are present in some embodiments to allow flexure during operation of the overall linkage (i.e., actuator arm 178). In embodiments formed of a single, integrally formed structure, the hinged portion(s) 188 of the actuator arm 178 are web portions that have a smaller cross-sectional area when compared to the remainder of the actuator arm 178. The web portions facilitate flexure of the overall linkage, as described above.

The connector 186 is also coupled to, or integrally formed with, a second linkage member 190. The second linkage member 190 includes a first segment 192 and a second segment 194. The first segment 192 is coupled to the connector 186 and is oriented substantially vertically in a relatively parallel manner with the first linkage member 180. The second segment 194 extends substantially horizontally from the first segment 192. The actuator arm 178 is selectively manipulated between a locked position and an unlocked position to impart movement of the second lock member 108, thereby locking and unlocking the lock mechanism assembly 100.

The actuator arm 178 is biased toward the locked position due to a torsion spring 196 that is coupled to the connector 186. In the locked position, the second lock member 108 freely rests in a position that maintains engagement of the teeth 112 and 116. When the actuator arm 178 is in the unlocked position, the first linkage member 180 urges the second lock member 108 to rotate about the pin 162 such that teeth 116 are not in contact with teeth 112. Thus, when the actuator arm 178 is in the unlocked position, the teeth 112, 116 do not interfere with the rotation of the head restraint 40 about axis A2 in either the forward or rearward directions 138, 142.

The head restraint 40 includes a push button 204 that is accessible to a user outside of the cover(s) of the head restraint 40. The button 204 is operatively coupled to a push rod 208 that is in contact with the second segment 194 of the second linkage member 194 of the actuator arm 178. When the button 204 is depressed, it moves the push rod 208 against the actuator arm 178 such that the actuator arm 178 overcomes the bias of the spring 196 and moves to the unlocked position. Once the button 204 is released, the spring 196 returns the actuator arm 178 to the locked position. As described above, the actuator arm 178 may be configured to flex slightly during actuation of the actuator arm 178 with the button 204. In particular, one or more regions therealong that facilitate a desired amount of flexing are present. A living hinge or other flexible member is included at each location that is configured to flex.

Accordingly, during normal operation of the head restraint 40, with the button 204 released, a vehicle user may adjust the position of the head restraint 40 by rotating the head restraint about axis A2 in the forward direction 138; the head restraint 40 will remain in whatever position it is in when the user stops rotating the head restraint because the springs 174 will urge the head restraint 40 in the rearward direction 142, whereas the teeth 112, 116 will prevent rearward movement of the head restraint. The teeth 112, 116 provide incremental detents when the head restraint 40 is rotatably adjusted forward or rearward about axis A2. To move the head restraint rearward, the vehicle user may push the button 204, thereby removing the contact between teeth 112, 116, and the springs 174 will return the head restraint 40 to its fully upright position.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A head restraint assembly comprising:

a base including a cross member;

a head restraint having a housing;

an internal cavity at least partially defined by the housing;

a lock mechanism assembly retained within the internal cavity, the lock mechanism assembly comprising a first lock member and a second lock member, the first lock member including a first plurality of teeth and the second lock member including a second plurality of teeth, wherein the first plurality of teeth and the second plurality of teeth are engageable with each other and selectively rotatable with respect to each other in a first direction and a second direction;

an actuator arm engaged with the second lock member and configured to selectively permit rotation of the second lock member relative to the first lock member;

a frame disposed within the interior cavity and operatively coupled to the housing, wherein the frame is substantially U-shaped with a first downwardly extending leg and a second downwardly extending leg, the first downwardly extending leg terminating at a first frame end region and the second downwardly extending leg terminating at a second frame end region; and a first retaining component having a first cross member aperture and a second retaining component having a second cross member aperture, each retaining component operatively coupled to the housing of the head restraint, wherein the first frame end region is disposed adjacent to the first retaining component and the second frame end region is disposed adjacent the second retaining component.

2. The head restraint assembly of claim 1, further comprising a push button accessible to a user from an exterior region of the head restraint assembly, the push button operatively coupled to the actuator arm.

3. The head restraint assembly of claim 1, wherein the actuator arm comprises a linkage comprising a plurality of linkage segments.

4. The head restraint assembly of claim 3, further comprising at least one hinged location of the linkage.

5. The head restraint assembly of claim 3, wherein at least a portion of the linkage comprises plastic.

6. The head restraint assembly of claim 3, further comprising:
a connector operatively coupling the linkage segments; and
a torsion spring surrounding at least a portion of the connector to bias the actuator arm toward a position that disposes the lock mechanism in a locked condition.

7. The head restraint assembly of claim 1, wherein the frame is formed of steel.

8. The head restraint assembly of claim 1, further comprising a bushing disposed between the cross member and the frame.

9. The head restraint assembly of claim 8, wherein the bushing is formed of plastic.

10. The head restraint assembly of claim 1, further comprising a pin extending through the frame and the second lock member, the second lock member pivotable about the pin.

11. The head restraint assembly of claim 10, wherein the pin is formed of steel.

12. A head restraint assembly for a vehicle comprising:
a base including a cross member;
a head restraint having a housing at least partially defining an internal cavity;
a lock mechanism assembly retained within the internal cavity, the lock mechanism assembly comprising a first lock member and a second lock member, the first lock member including a first plurality of teeth and the second lock member including a second plurality of teeth, wherein the first plurality of teeth and the second plurality of teeth are engageable with each other to permit rotation of the head restraint in a forward direction of the vehicle and to restrict rotation of the head restraint in a rearward direction of the vehicle in a first condition of the lock mechanism;
an actuator arm engaged with the second lock member and configured to selectively permit rotation of the head restraint in the rearward direction in a second condition of the lock mechanism;
a frame disposed within the interior cavity and operatively coupled to the housing, wherein the frame is substantially U-shaped with a first downwardly extending leg and a second downwardly extending leg, the first downwardly extending leg terminating at a first frame end region and the second downwardly extending leg terminating at a second frame end region;
a first retaining component having a first cross member aperture and a second retaining component having a second cross member aperture, each retaining component operatively coupled to the housing of the head restraint, wherein the first frame end region is disposed adjacent to the first retaining component and the second frame end region is disposed adjacent the second retaining component; and
a push button accessible to a user to manipulate the lock mechanism from the first condition to the second condition, the actuator arm comprising a linkage comprising:
a first linkage member operatively coupled to the push button;
a connector coupled to the first linkage member, the connector biased with a torsion spring; and
a second linkage member operatively coupled to the connector and to the second lock member, wherein the connector is biased in a direction that biases the lock mechanism to be in the first condition.

13. The head restraint assembly of claim 12, further comprising at least one hinged portion of the linkage.

14. The head restraint assembly of claim 12, further comprising a bushing disposed between the cross member and the frame.

15. The head restraint assembly of claim 12, further comprising a pin extending through the frame and the second lock member, the second lock member pivotable about the pin.

* * * * *